(12) United States Patent
Badent et al.

(10) Patent No.: US 12,257,620 B2
(45) Date of Patent: Mar. 25, 2025

(54) JOINING TOOL UNIT, TOOL GRIPPER, AND JOINING PROCESS

(71) Applicants: TOX PRESSOTECHNIK GMBH & CO. KG, Weingarten (DE); ALPHA LASER GMBH, Puchheim (DE)

(72) Inventors: Michael Badent, Weingarten (DE); Wolfgang Pfeiffer, Hagnau am Bodensee (DE); Marcus Matzke, Ravensburg (DE); Juergen Sollner, Waldburg (DE)

(73) Assignees: TOX PRESSOTECHNIK GMBH & CO. KG, Weingarten (DE); ALPHA LASER GMBH, Puccheim (DE)

( * ) Notice: Subject to any disclaimer, the term of this patent is extended or adjusted under 35 U.S.C. 154(b) by 0 days.

(21) Appl. No.: 18/437,544

(22) Filed: Feb. 9, 2024

(65) Prior Publication Data

US 2024/0261849 A1    Aug. 8, 2024

Related U.S. Application Data

(63) Continuation of application No. PCT/EP2022/070306, filed on Jul. 20, 2022.

(30) Foreign Application Priority Data

Aug. 13, 2021   (DE) .................... 10 2021 121 084.4

(51) Int. Cl.
*B21J 15/44*  (2006.01)
*B21J 15/02*  (2006.01)

(52) U.S. Cl.
CPC ............. *B21J 15/44* (2013.01); *B21J 15/022* (2013.01)

(58) Field of Classification Search
CPC .......... B21D 39/031; F16B 5/04; F16B 5/045; B21J 15/025; B21J 15/10; B21J 15/28; B21J 15/44; B21J 15/022; B23P 19/062
See application file for complete search history.

(56) References Cited

U.S. PATENT DOCUMENTS

| | | | | |
|---|---|---|---|---|
| 2014/0230242 | A1* | 8/2014 | Flis | B21J 15/28 29/798 |
| 2021/0178457 | A1* | 6/2021 | Savoy | B21K 25/005 |
| 2024/0181519 | A1* | 6/2024 | Badent | B21J 15/10 |

FOREIGN PATENT DOCUMENTS

| | | |
|---|---|---|
| DE | 21 2015 000 312 U1 | 2/2018 |
| DE | 10 2018 202 140 A1 | 8/2019 |

(Continued)

OTHER PUBLICATIONS

German Search Report (Application No. 10 2021 121 084.4) dated Apr. 11, 2022 (8 pages).

(Continued)

*Primary Examiner* — Lee A Holly
(74) *Attorney, Agent, or Firm* — BURR PATENT LAW, PLLC

(57) ABSTRACT

A joining tool unit including a hold-down device, a linearly movable tool, and a tool counter element. The hold-down device and the tool counter element are provided opposite each other, a workpiece lies on the tool counter element when the workpiece is arranged on the joining tool unit, and the hold-down device is arranged to be supported on a surface of the workpiece. The hold-down device has a light-guiding system, and the light-guiding system is designed to guide a light beam of a light in the direction of a joint location of the workpiece when the workpiece is arranged on the joining tool unit. The light-guiding system is provided on the hold-down device such that the light beam is irradiated onto the joint location solely at an angle which (Continued)

is greater than 0° relative to a movement axis of the linearly movable tool.

12 Claims, 4 Drawing Sheets

(56) References Cited

FOREIGN PATENT DOCUMENTS

| | | |
|---|---|---|
| EP | 2 543 451 A1 | 1/2013 |
| JP | 2019-000883 A | 1/2019 |

OTHER PUBLICATIONS

International Search Report and Written Opinion (Application No. PCT/EP2022/070306) dated Nov. 21, 2022 (15 pages).
International Preliminary Report on Patentability (with Chapter II Claims) (Application No. PCT/EP2022/070306) dated Dec. 21, 2023 (with English translation) (27 pages).

\* cited by examiner

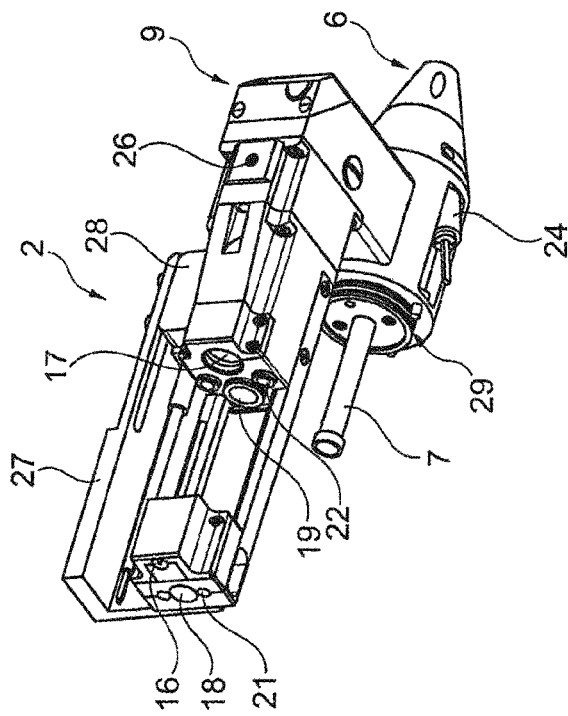
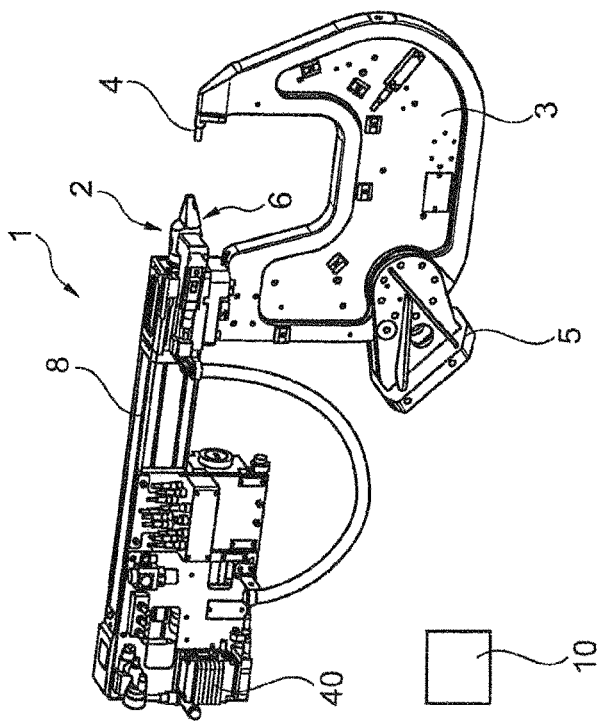

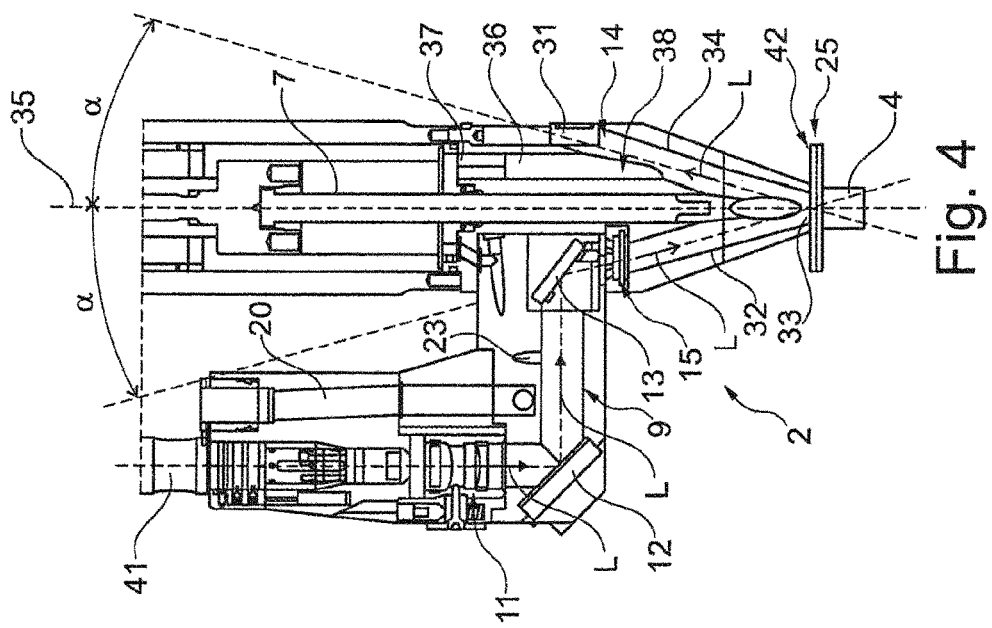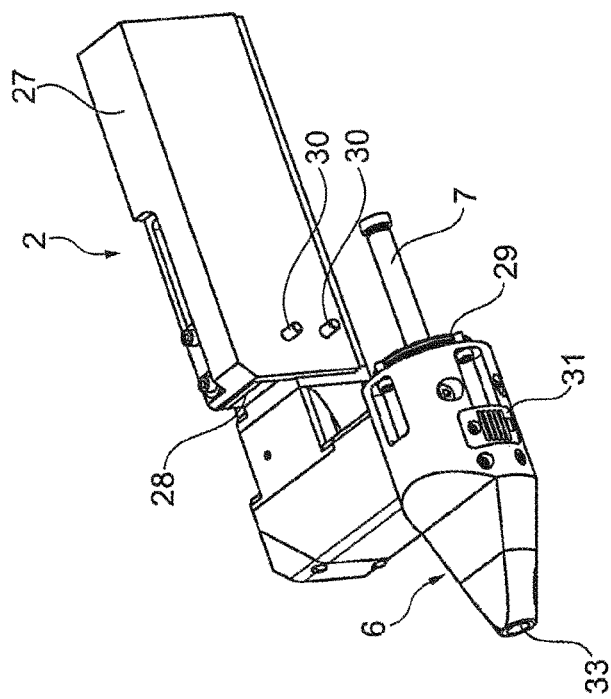

JOINING TOOL UNIT, TOOL GRIPPER, AND JOINING PROCESS

CROSS REFERENCE TO RELATED APPLICATIONS

This application is a continuation of International Application No. PCT/EP2022/070306 filed Jul. 20, 2022, which designated the United States, and claims the benefit under 35 USC § 119(a)-(d) of German Application No. 10 2021 121 084.4 filed Aug. 13, 2021, the entireties of which are incorporated herein by reference.

FIELD OF THE INVENTION

The present invention relates to a joining tool unit, a tool gripper and a joining process.

BACKGROUND OF THE INVENTION

Joining tool units for processing workpieces are known, for example, joining tools having such units for joining by forming workpieces in which the workpiece is held between two sections of the joining tool unit during the processing process.

For example, a section comprises a tool or a tool element of the joining tool unit, such as a punch or die.

Frequently, considerable practical problems arise when it comes to the use of known joining tool units using alternative or new technologies, for example, regarding the safety for people working in the vicinity of the place of use and/or the broad practical application, for example, in automated processes. Some technologies have outstanding advantages for special areas of application, while there are considerable obstacles in the practical implementation so that individual technologies with high potential are not widely used in industrial applications or do not go beyond a research or development stage.

SUMMARY OF THE INVENTION

The object of the present invention is to provide a joining tool unit which is improved with regard to the use of alternative technologies, or an improved joining operation. In particular, the present invention is based on the object of providing a joining tool unit by means of which light-energy-based technology with workpiece-side energy input by way of light radiation is usable with sufficiently high safety for the user and practicably and advantageously for the automated application.

The present invention proceeds from a joining tool unit, wherein the joining tool unit has a holding-down device with a linearly movable tool, and a tool counter-element, wherein the holding-down device with the linearly movable tool and the tool counter-element are located opposite each other, wherein a workpiece in the arranged state at the joining tool unit rests on the tool counter-element, wherein the holding-down device in the arranged state of the workpiece at the joining tool unit is arrangeable so as to abut a surface of the workpiece, wherein the holding-down device has a light guidance system, wherein the light guidance system is designed to guide a light beam of light in the direction of a joining site of the workpiece when the workpiece is arranged at the joining tool unit, wherein the light guidance system is present at the holding-down device in such a way that the light beam irradiates the joining site exclusively at an angle of greater than 0° to a movement axis of the linearly movable tool, wherein the light guidance system of the holding-down device shields the light along its light beam against the outside in a light-tight manner.

The proposed light guidance system makes it possible to use the joining tool unit in a practical manner. In particular, the joining tool unit can be advantageously used without any major additional measures, for example, regarding safety aspects with regard to a hazard potential of high light energy. Thus, it is advantageously possible in practice to provide the joining tool unit according to the invention for extended applications compared with known joining tool units. The present invention can achieve constructive and thus technological and safety-related advantages.

The light-tight shielding of the light beam against the outside by the light guidance system relates to the arranged state of the workpiece at the joining tool unit. An exit opening of the light guidance system provided for the exit of the light beam, for example, in the region of a free front end face of the holding-down device, is then covered by the surface or outside of the workpiece. The holding-down device lies with its end face against the surface of the workpiece.

This makes it possible that no safety-relevant components of the light beam and thus of the light energy can reach the environment outside. The light beam is shielded like a hole on its way to the exit opening of the light guidance system or of surrounding walls of the closed line, for example, integrated in the holding-down device.

The light beam leaves the light guidance system at the exit opening and is then incident on the surface of the workpiece in the region of a joining point or a joining site to be formed subsequently. The workpiece material heats up and softens due to the energy input with the light beam by absorbing the light energy.

In the case of a workpiece not arranged at the joining tool unit, safety precautions are taken to ensure that a light beam does not exist or that the light source is deactivated in order to reliably exclude any danger to persons in the close vicinity of the joining tool unit.

With the proposed light guidance system, the joining tool unit is comparatively simplified, in particular, comparatively cost-effective. For example, a joining tool unit can be realized hereby which does not require an additional enclosure for protecting an employee against radiation. The light guidance system is integrally designed and provides the radiation protection against the outside. This is of particular importance and advantageous for a laser light application, for example.

In particular, materials or material combinations that have until now been difficult to process or not suitable in practice for processing with conventional joining tools are advantageously able to be processed with the proposed joining tool unit comprising a light beam treatment on the basis of the proposed light guidance system, even under industry-relevant specifications. This means that the joining tool unit can be used with the aid of the light beam treatment with the described light guidance system for applications that are characterized by a comparatively high degree of automation, such as applications in line production, for example, of vehicles in automotive production.

One disadvantage of a concept whereby a light-based energy input takes place at the workpiece with the joining tool unit is comparatively long joining cycle times. It is also a disadvantage that, due to the use of laser light, for example, radiation protection of persons in the close vicinity of the joining tool unit, who work with the joining tool unit or may be located in the region of the joining tool unit, must be ensured. In such a joining tool unit, for example, the complete joining tool unit must for this purpose be provided with an enclosure which is not passable for light of the laser beam or shields it against the outside. Such concepts are comparatively expensive and complex and are not practical for automated, e.g. robot-assisted production lines.

The light guidance system is designed, for example, in such a way that the radial distance of the light beam over the light beam extent decreases or becomes smaller toward the movement axis of the movable tool in the direction of the tool counter-element or toward the free end face of the holding-down device. Preferably, the light beam has a linear, for example, a non-focused or non-expanding profile. Accordingly, the line of the light guidance system in the holding-down device is also preferably linear or formed with a constant continuous incline of between zero and 20 angle degrees with respect to the movement axis of the movable tool.

The light guidance system or the light beam is aligned in such a way that when the workpiece is arranged, the light is incident on a region of a surface of the workpiece in which joint processing, such as a clinching process, is carried out by the movable tool, in particular, the movable tool is having a deforming effect on the surface, for example, dips into the workpiece during processing. Preferably, the region of the surface of the workpiece irradiated or impinged upon by the light beam forms an approximately circular area. The size and/or shape of the surface area of the workpiece surface irradiated by the light beam emerging from the holding-down device lies within the range of a size and/or shape of a front face of the movable tool that acts on the workpiece surface during workpiece processing.

The present invention advantageously achieves a fundamental functional extension with a new function of a standard component of joining tool units or the holding-down device. The standard component is advantageously a component close to the workpiece or a punch-side and/or die-side holding-down device.

Due to the possibility of the workpiece to be joined being heated by the joining tool unit, an improvement of already possible or currently known connection applications can be realized.

The light guidance system integrated in the holding-down device allows the light beam to be advantageously directed directly to the workpiece. In addition, the light guidance system can be integrated and enveloped within the component volume of the holding-down device without the need for a redesign of the holding-down device. In addition, integral housing within a component, such as the holding-down device, which is necessarily or at any rate part of the joining tool unit, is achieved.

Therefore, no or no undesirable constructive change to the joining tool unit is necessary compared with known joining tool units.

Advantageously, with the proposed light line integrated in the holding-down device, no further or additional components at the joining tool unit are necessary compared with known joining tool units. In addition, there is advantageously no need for further kinematics, for example, with a drive and motion control and motion bearing for providing the light beam guidance and the light beam, for example, for providing beam paths of the light beam or for moving in and out sections of the joining tool unit which are present in the light beam path in previous joining tool units, which entails constructive, economic and technical disadvantages.

To provide the light beam, a light source such as a laser light source is provided, which is, for example, part of the joining tool unit.

The slight incline of the light beam toward the joining site at the workpiece enables a comparatively slim design of the holding-down device, in particular, in its front end section facing the tool counter-element, where there is almost no change in an external dimension of the holding-down device, which is advantageous, for example, for the arrangement and accessibility of the joining tool unit at the workpiece or its joining site for processing with the movable tool.

The connection and positioning of the light guidance system and the light source to and at the joining tool unit are also advantageously possible in a region which is, for example, facing away from the front end of the holding-down device, which is facing the tool counter-element. With the inclination of the light beam, the radial distance from the movement axis of the movable tool increases as the distance of the light guidance system from the front end of the holding-down device increases. The region which is relatively wider or larger in diameter due to the inclined radiation line and is facing away from the front holding-down end is less space-critical. There, therefore, a connection of elements and lines connected to the light guidance system in the holding-down device, such as plugs for connection devices, can be advantageously carried out.

For example, the light guidance system envelops the light along the light beam or along its beam path in the joining tool unit or envelops the space that the light beam can occupy. This means that the light is shielded against the outside by the light guidance system in a light-tight manner in the radial direction with respect to the light beam or radially with respect to the light beam path. Light-tight shielding provided with the light guidance system for the light beam in the holding-down device can be advantageously set up, in particular, due to the buried or integrated housing of the light line within the holding-down device.

Preferably, the light-tight shielding in the holding-down device by the light guidance system can be advantageously set up due to the line of the light guidance system within the holding-down device, for example, carved out from the solid material of the holding-down device or in the surrounding solid material of the holding-down device.

Light-tight means, based on the arranged state of the workpiece at the joining tool unit or at the holding-down device, in particular, a power loss of between zero and 20 percent based on a power of the light in the light guidance system or within a line of the light guidance system. The line of the light guidance system is present inside the holding-down device. The maximum power loss of up to about 20%, which is understood to mean light-tight, may also be based on another reference variable of the light power, such as an optical output power or a nominal device power of the light beam, for example, the light beam source.

The power loss preferably refers to a power of the light in the light guiding system of the holding-down device in the region of an open end of the light guidance system of the holding-down device such as the exit opening. This may differ from a power of the light that can be measured at the light source, since power losses occur on the path of the light from the light source along the subsequent light path in the light guidance system, for example, through reflection or absorption or chemical reactions and the like.

The open end of the light guidance system of the holding-down device or the exit opening is, in particular, facing a workpiece surface of the workpiece to be processed. Coming from the open end of the light guidance system, the light beam is incident on the surface of the workpiece to be heated. This is, for example, the region of the exit site of the line of the light guidance system on the holding-down device, at its end facing the tool counter-element or its side facing a die unit.

Accordingly, in the direction of the joining axis opposite the die unit, the holding-down device with the linearly movable tool, such as preferably a punch or plunger of a punch unit, is present. The joining tool unit comprises, for example, a punch unit with a tool designed as a punch and a die unit, between which the workpiece can be positioned.

The exit region of the light beam at the end of the line of the light guidance system in the holding-down device faces the workpiece when the workpiece is arranged. The light beam is incident on the workpiece surface on the holding-down device side, with the workpiece surface facing the holding-down device. With a workpiece side lying opposite or facing away from the workpiece surface on the holding-down device side, the workpiece rests against the tool counter-element, such as an end face of a die or a die support side, for example.

For example, the movable tool is present so as to be movable only linearly along a movement axis. For this purpose, for example, a drive unit, such as a linear drive, is provided, for example, a pneumatic-hydraulic, hydraulic, pneumatic and/or electric drive unit. Preferably, the drive unit for the movable tool and/or the holding-down device comprises an electromechanical servo drive.

In the arranged state of the workpiece at the joining tool unit, the holding-down device usually touches the workpiece with a, for example, flat or planar side, for example, with its end face, wherein the plane of the end face is axially aligned in the tool movement direction, at least during the joining operation, preferably parallel to the respective surface of the workpiece. The holding-down device can also perform a scraper function. The scraper function supports or causes a separation, in particular, of the tool and the workpiece after the joining operation. The holding-down device may alternatively be designed to serve solely as a beam shield and/or solely for guiding the light beam.

For example, the holding-down device in the arranged state of the workpiece at the joining tool unit is arrangeable by way of the joining tool unit so as to abut the surface of the workpiece. The abutting arrangement at the workpiece can be implemented with a drive unit and/or a spring unit of the joining tool unit. Preferably, the preferably exactly one drive unit acts on the movable tool, such as a punch. The drive unit preferably acts on the holding-down device and/or on the spring unit.

For example, the holding-down device in the arranged state of a workpiece at the joining tool unit is arrangeable so as to abut a surface of the workpiece, so that the holding-down device touches and/or is in contact with the surface. A contact quality between the holding-down device and the workpiece can be influenced by specifying a force, wherein the force is a pressing force or compressive force that acts between the holding-down device and the surface of the workpiece. For this purpose, for example, a mechanical spring, for example a screw compression spring or an air spring, is present, which presses axially on the holding-down device with respect to the movement axis of the movable tool or preloads the holding-down device in the direction of the tool counter-element.

The joining tool unit can be used, for example, to process a workpiece that comprises exactly one workpiece layer. The joining tool unit can alternatively be used to process a workpiece which, for example, comprises two or more than two workpiece layers which rest on one another during the processing in the region of the joining point that can be produced with the joining tool unit. The workpiece layers can be connected to one another with the joining tool unit in a joining operation, for example, by means of a joining connection, and/or a connecting or joining element can be fastened to the workpiece with the joining tool unit.

The joining tool unit is advantageously designed for setting a functional element, for example, for setting a punching nut, a rivet nut, a press-in nut, a bolt, a screw element on the workpiece and/or for clinching and/or for setting a rivet such as a clinch rivet, solid punching rivet or a half-hollow punching rivet. A functional element can be riveted, pressed, punched or clinched into the workpiece with the joining tool unit, for example.

With the joining tool unit, e.g. a plurality of workpiece parts can be connected to one another, for example, with a connecting element such as a rivet or without a connecting element, e.g. by a clinching operation. With the joining tool unit, it is possible to set the functional element at a workpiece that, for example, consists of exactly one workpiece part.

Advantageously, material combinations or workpiece layers each consisting of different materials can also be processed with the proposed joining tool unit. For example, the respective workpiece layers can consist in each case of one material, wherein the workpiece layers have greatly different technological properties among themselves regarding for example formability, flowability, brittleness, toughness, hardness, ductility or metal composition of the material. Preferably, the workpiece side or the workpiece layer against which the movable tool rests during a joining operation and forms it is harder and/or more brittle than a further workpiece layer which is present below it or in the direction of the tool counter-element.

For example, the joining tool unit is designed in such a way that the workpiece layer, the material of which, for example, has a comparatively higher brittleness, thus tending to crack during forming, at which the movable tool acts for workpiece processing, can be heated by the light beam incident on the workpiece side. The brittleness of the material is thus greatly reduced for a short time.

The targeted and defined or safe possibility of supplying the light to the workpiece via the light guidance system and of heating the workpiece region to be processed is advantageous. Due to the light-energy input via the light beam, the irradiated material is briefly brought into a material state region which is advantageous with regard to forming, is preferably softer or is better flowably formable. At usual workpiece temperatures, which are determined by typical ambient temperatures, for example, in the range of approx. 15 to approx. 30 degrees Celsius at the place of processing, cracks or the like have hitherto occurred, for example, in the case of corresponding materials, which result in the joining point not meeting the requirements set for it, which is detrimental or leads to waste.

Advantageously, it is, in particular, possible with the proposed joining tool unit to produce a joining connection with a comparatively very brittle material, for example, a joining connection between a hard and/or brittle workpiece layer and a workpiece layer from a comparatively well formable or softer material, based on a typical ambient temperature level, e.g. in the range of 15 to 30 degrees Celsius.

It is also advantageous that, for example, both the movable tool and the tool counter-element perform a simultaneous movement away from the workpiece or toward the workpiece. Advantageously, the workpiece in this case is positioned by a separate holding element between the movable tool and the tool counter-element.

The holding-down device may alternatively be designed to serve solely as a beam shield and/or solely for guiding the light beam. The light beam is preferably a laser beam, wherein the laser beam can be continuous and/or pulsed. The light source is preferably a laser light source or a laser or a solid-state laser, gas laser or liquid laser. Furthermore, the light of the light beam can also be in the visible, UV and/or IR range. Advantageously, a wavelength of the light provided by the light source is tuned to an absorption maximum of the material of the workpiece to be processed or the workpiece layer such that the most energy-efficient heat input into the workpiece is realized by the light from the light source.

The light guidance system is preferably designed in the holding-down device such that the light guidance system envelops the light along the light beam so that the light is shielded in the radial direction with respect to the light beam against the outside by the light guidance system. For example, the light guidance system comprises a passage within the holding-down device. The light beam travels inside the passage. The holding-down device, for example, also has a cutout which serves as a housing and movement space for the movable tool. This is, for example, a joining punch channel if the movable tool is a joining punch. The cutout is cylindrical, for example, in the case of the outer shape of the joining punch being cylindrical. For example, the central longitudinal axis of the cutout coincides with the movement axis of the movable tool. The light beam is inclined with respect to this axis by more than 0° or more than zero angle degrees. Accordingly, the passage in the light guiding system is inclined with respect to the cutout. The passage of the light-guiding light guidance system or the light guidance system in the holding-down device may lead into the cutout in the proximity of an end face or near a free end of the holding-down device. An exit opening of the light guidance system is then present, for example, in a wall of the tool channel or the joining punch channel. However, the exit opening of the light guidance system can also be separate from the channel of the tool, i.e. be present in the end face of the holding-down device toward an opening of the joining punch channel as a wide opening. The light guidance system is then not incident on the movement channel of the tool or the joining punch channel. The passage and the cutout are then two unconnected cavities in the holding-down device or do not merge into each other.

The light guidance system also includes an arrangement wherein the light guidance system is present on the outside of the holding-down device, for example, by means of a closed line, such as by means of a line, which extends on the outside of the holding-down device or partially buried to an outside of a holding-down device surface, or is present adjacent to it. It is also conceivable that the passage is tubular, e.g. is present as a tube at the holding-down device.

It is also conceivable that the joining tool unit has a holding-down device at the tool counter-element and the light guidance system is formed at the holding-down device of the tool counter-element.

Preferably, the passage of the light guidance system, in particular, a cylindrical passage, is present within the holding-down device, preferably fully closed circumferentially to the light line axis, wherein the light can be guided toward the workpiece along the cylinder axis of the passage, for example, the longitudinal extent of the passage. The passage is, for example, surrounded by material of the holding-down device, which extends to the passage. For example, the passage is present as a hole, e.g. as a through hole in the holding-down device. However, it is also conceivable that the light guidance system has a glass fiber, and the glass fiber is fixed at or in the holding-down device, which can, for example, be partially hollow.

The joining tool unit is operated with a control unit, for example, the control unit is part of the joining tool unit. The control unit is designed to control the drive unit in an open loop and/or closed loop, wherein the control unit is designed to control the light source and/or a component of the light guidance system in an open loop and/or closed loop.

It is further proposed that the control unit of the joining tool unit is designed to terminate irradiation or illumination of the joining site of the arranged workpiece with the light from the light source at the same time as the start of the movement of the movable tool or temporally after the start of the movement of the movable tool. As a result, a joining cycle time is comparatively shorter. It is conceivable that irradiation or illumination of the joining site of the arranged workpiece with the light from the light source is terminated before the start of the movement of the movable tool.

For example, the control unit is designed to switch off the light source at the same time as the start of the movement of the movable tool or temporally after the start of the movement of the movable tool and thus terminate irradiation or illumination of the joining site of the arranged workpiece with the light from the light source.

For example, based on a joining operation of the workpiece by the joining tool unit, the joining tool unit is designed such that a movement of the movable tool in the direction of the tool counter-element is started and, simultaneously or temporally thereafter, irradiation or illumination of the joining site with the light from the light source is terminated.

It is further conceivable that the joining tool unit has a sensor unit, wherein the joining tool unit is designed to detect by means of the sensor unit whether for example the holding-down device abuts the workpiece in the position. The sensor unit comprises for this purpose, for example, a pressure sensor, which detects a dynamic pressure in the interior of the holding-down device.

For example, the sensor unit is designed to ascertain whether the holding-down device abuts the workpiece at the position in such a way that the holding-down device, due to the fact that is rests against the workpiece, shields the light radiation or the light from the light source against the outside in a light-tight manner such that a hazard to a person in the environment of the joining tool unit is ruled out. For example, the sensor unit detects with a sensor or a pressure sensor of the sensor unit a dynamic pressure of a fluid such as air, which is present or enclosed between the holding-down device and the workpiece. For example, the fluid is introduced into a flow channel through an inlet for the fluid before the light beam is activated. The flow channel for the fluid, for example, is at least partially formed by the light guidance system or by the light guidance channel of the light guidance system.

Alternatively, the sensor can measure, for example, an amount of energy, a temperature or a quantity of light.

For example, the joining tool unit checks, in particular, by means of the control unit, whether a measured sensor value of the sensor unit lies in a specified target range or safety range before irradiation or illumination of the joining site of the arranged workpiece with the light from the light source is started and/or before movement of the movable tool is started. If the measured sensor value is not within the specified target range, the joining tool unit blocks, in particular, via the control unit, a start of irradiation or illumination of the joining site of the arranged workpiece with the light from the light source and/or a start of a movement of the movable tool.

The holding-down device is advantageously slim in terms of its shape and advantageously adapted to the housing of the light guidance system therein. For example, the holding-down device has an outside with a jacket side, wherein the jacket side extends between the free end and a rear end of the holding-down device remote from the free end, wherein the jacket side comprises a first partial region and a second partial region, each extending over the axial length of the holding-down device, and wherein the partial regions are radially opposite to the joining axis, wherein the first partial region has a flat outer contour, wherein in a cross section of the holding-down device perpendicular to the joining axis, the first partial region has in an angle region of at least 10 angle degrees a smaller radial distance from the joining axis than the radial distance from the joining axis of the second partial region in the same cross section.

For example, a cross section has an area shape with a border of the area in such a way that the centroid of this cross section is offset from the intersection of the cross section with the joining axis, in particular, offset in the direction of the second partial region.

The centroid in question is offset from the joining axis, wherein a first partial region lies diametrically opposed to the second partial region. Preferably, points of the first partial region lie diametrically opposed to points of the second partial region. For example, an azimuthal extent of the partial regions is such that an associated angle region of the first partial region, for example, spans up to less than 90 angle degrees.

The jacket side of the outside of the holding-down device has, for example, a convex outer shape or outer contour in the second partial region, such as a raised shape. Within this volume region up to the joining axis or a section through the joining axis, the light guidance system is preferably housed. The outer shape or outer contour of the jacket side surrounding the first partial region is flat on the outside, for example, or so reduced in terms of the material that sufficient but, for example, minimum component strength is ensured. With the flattened side of the outside of the holding-down device, it is advantageously possible for even at narrow points on a workpiece or in confined surroundings on components at which the joining site is to be set up to be easily accessible with the frontmost part of the joining tool unit, which is closed by an end face of the holding-down device.

For example, there is another, e.g. a second, passage in the holding-down device. It is conceivable that the second passage is mirror-symmetrical to the first passage in the holding-down device. Preferably, the mirror axis is parallel to the movement axis of the movable tool. If, for example, the movement axis of the movable tool extends through the center of the holding-down device, the movement axis preferably corresponds to the mirror axis.

For example, the first and the second passage are formed in the holding-down device in such a way that the light from the light source is guided along the first passage onto the workpiece when the holding-down device abuts the workpiece and that the light from the light source reflected from the workpiece is guided along the second passage. For example, the holding-down device comprises a beam trap or a beam dump, in which the reflected light is captured and absorbed.

By guiding the light beam along the first and second passages in the holding-down device, a protective cabin can be dispensed with.

It is also conceivable that the light guidance system has a shutter or an optical shutter, i.e., for example, a mechanical or electronic shutter. For example, illumination of a joining site by the light from the light source can be activated or deactivated by means of the shutter. For example, the shutter has a movable element. Advantageously, the shutter can be controlled, or the movable element can be actuated, by means of the control unit. The movable element, which consists of an opaque material, for example, can be inserted into the path of the light beam to block it and be moved out again, for example.

Advantageously, the holding-down device is designed in such a way that in the arranged state of a workpiece at the joining tool unit, the holding-down device is arrangeable so as to abut the surface of the workpiece such that the holding-down device encloses the joining site so that a maximum of 20% of the radiant power of the light is emitted to the outside between the holding-down device and the surface of the workpiece. The light penetrating to the outside finds its way through at least one gap between the holding-down device end face and the opposite surface of the workpiece. The maximum 20% of the radiant power of the light preferably refers to the light power which emerges at the exit point of the light beam, at the front of the holding-down device, in the direction of the surface of the workpiece.

The holding-down device is preferably designed such that a maximum of 10% of the radiant power of the light radiates outwards between the holding-down device and the surface of the workpiece, or that a maximum of 5% of the radiant power of the light radiates outwards between the holding-down device and the surface of the workpiece or so that a maximum of 3% of the radiant power of the light radiates outwards between the holding-down device and the surface of the workpiece, preferably that 0% of the radiant power of the light radiates outwards between the holding-down device and the surface of the workpiece.

As a rule, the surface of the workpiece contacted by the holding-down device is planar and flat. Therefore, for example, a side of the holding-down device facing the tool counter-element, such as an end face of the holding-down device, which comes to rest against the workpiece when the workpiece is arranged, is also or correspondingly planar and flat. Preferably, the end face has a comparatively very low roughness. In addition, it is advantageous if at least the end face of the holding-down device provides a smooth planar surface. For example, the surface of the end face is smoothed or polished. The holding-down device end face is preferably made of a mechanically comparatively resistant or deformation-resistant material, such as a carbide or a high-carbon steel material.

In practice, even in the best conditions in practice, small portions of the light beam appear as stray light when the holding-down device has been placed on the workpiece. This is because it is not possible as a rule to implement an absolutely planar placement of sections of the holding-down device and sections of the surface of the workpiece, or to effect an exactly perpendicular placement of the holding-down device on the workpiece surface. In practice, this means that there are regularly gap regions with a small gap width, for example, in the tenth of a millimeter range, between the holding-down device surface, or holding-down device front end surface, and the workpiece surface in the arranged state at the workpiece. Portions of the stray light can pass to the outside into the environment of the joining tool unit through a gap between the holding-down device or its end face and the surface of the workpiece. The gap may exist at the holding-down device and the workpiece, for example, due to unevennesses such as, in particular, point-shaped depressions or elevations in/on the two opposing surfaces, and/or result from a non-parallel alignment of the opposite surfaces, e.g. between the holding-down device end face and the workpiece surface.

The radiant power for the radiation to the outside is, for example, a radiant power of the light that exits at an opening in the light guidance system at the holding-down device and is directed toward the joining site or a radiant power of the light that arrives at the joining site.

The underlying radiant power may alternatively be a radiant power that can be provided with the light source, for example, a nominal power of the light source.

As a possible measure to limit the radiant power of the light passing to the outside to a maximum of 20%, which radiates outwards between the holding-down device or its end face and the surface of the workpiece lying opposite, a power limitation of the light power generated with the light source is possible, e.g. by means of adjusting means of the light source. Preferably, a power limitation is arranged such that a shielding of the light against the outside of at least 80%, preferably of at least 95%, based on a reference variable or a reference power of the light or the light radiation is effected.

The result is an advantage when the light guidance system is present on the holding-down device in such a way that the light beam irradiates the joining site of the workpiece exclusively in an angle region of between 5° and 40° relative to the movement axis of the linearly movable tool. This allows a constructive and/or production advantage to be achieved.

For example, the light beam irradiates the joining site of the workpiece in an angle region of between 5° and 40° relative to the movement axis of the linearly movable tool, or, for example, between 5° and 30°, or, for example, between 10° and 30°, or, for example, between 10° and 40°, or, for example, between 5° and 10° relative to the movement axis of the movable tool. For example, the light beam irradiates the joining site of the workpiece at an angle of 4°, 4.5°; 5°; 5.5°; 6°; 7°; 8°; 9° or 10° relative to the movement axis of the movable tool.

Adjusting means for adjusting the angle region at which the light beam is inclined relative to the movement axis of the linearly movable tool, for example, between greater than zero and less than 40 angle degrees are conceivable.

Preferably, the angle of incidence is as small as possible or as steep as possible relative to the movement axis of the linearly movable tool.

Preferably, a diameter of the light beam such as the diameter of a laser beam is adjustable. For this purpose, adjusting means for, for example, manual adjustment of the laser diameter are preferably provided at the joining tool unit.

According to an advantageous modification, the linearly movable tool is designed as a joining punch. The joining punch is movable at least in sections guided in the holding-down device. The holding-down device encloses the joining punch circumferentially over an axial length of the joining punch. The joining punch is used to join the workpiece, which consists of a formable material. The joining punch is preferably a joining punch for clinching, wherein, in interaction with the tool counter-element such as a clinching die, the joining punch deforms the material of the workpiece under a driven movement of the joining punch in the movement direction of the joining punch toward the tool counter-element. Accordingly, the joining tool unit is preferably a clinching tool unit. When clinching, the workpiece has typically two or more layers.

For setting a connecting or functional element at the workpiece, the joining punch acts via the respective element on the region, softened by means of the light beam, of the workpiece being deformed in the process.

It is also conceivable that the linearly movable tool is designed as a die tool, in contrast to a joining punch tool, or as part of a die unit. The linearly movable tool is, for example, a die tool part such as an inner part of the die unit, which is enclosed, for example, by a die support of the die. The die support is designed, for example, as a holding-down device of the die unit. In the holding-down device of the die unit, the light guidance system can preferably be housed as described above regarding the holding-down device.

Another advantage is that the tool counter-element has a second movable tool. The second movable tool is therefore a further, or the second, movable tool in addition to a first movable tool in the holding-down device, for example, a joining punch. For example, the second movable tool is present, in particular, in an exclusively linearly movable fashion. For example, the second movable tool is surrounded by a second holding-down device, for example, on a die side or as part of a die unit, if the tool counter-element comprises a die unit. For example, the first movable tool is surrounded by a first holding-down device.

The light guidance system is present at or in the first and/or second holding-down device. This means that a workpiece can be impinged upon by the light beam, for example, heated with a laser light beam, from a first side, from a second side or on both sides. This makes it advantageously possible to heat and soften a workpiece that comprises various materials combined with light radiation before joining.

It is also advantageous if a further, for example, second, light guidance system is present at the tool counter-element in order to guide light toward a further surface of the workpiece, wherein the workpiece rests at least with a section of the further surface on the tool counter-element. It is thus effectively possible to apply a desired or, compared to a single or one-sided light irradiation via the holding-down device, even greater amount of energy or amount of light to the workpiece in the region of the joining site. It is also possible, compared with the only light irradiation from the side of the first light guidance system or the holding-down device, to supply a corresponding amount of energy to the workpiece in a shorter time. The workpiece side belonging to the further surface of the workpiece is thus also advantageously heatable, which is advantageous for a deformation of material of the workpiece on the side of the tool counter-element by, for example, pressing the heated material into the tool counter-element. In addition, the additional energy input on the tool counter-element side with a portion of the energy introduced leads to lasting or continuous heating of the side of the workpiece against which the holding-down device rests, which is effected by heat conduction within the workpiece.

By means of a, for example, very limited effective time available for heating the workpiece, a comparatively stronger heating can take place and undesirable excessively fast cooling of the workpiece to below a limit temperature value in the region of the joining site after the light irradiation has been switched off, until the start of the deformation, can be counteracted.

In the case of a comparatively brittle material, heating of the workpiece on the tool counter-element side is advantageous on the part of the tool counter-element or during joining or deformation of a material that is prone to cracking on this side.

The further surface of the workpiece is thus a side facing, for example, the tool counter-element, for example, a rear surface of the workpiece, which comes to rest against the tool counter-element before and during processing by the joining tool unit. The rear surface of the workpiece is opposite a front surface of the workpiece, wherein the holding-down device can be brought into contact at the front surface of the workpiece, or in which the holding-down device is in contact in the state of the joining tool unit being arranged at the workpiece. This is based in each case on the region of the workpiece which comprises the joining site that exists after the workpiece has been processed by the joining tool unit.

The tool counter-element is designed, for example, as a die unit with a movable or non-movable tool or die tool of the die unit and a die support. The die support is, for example, a part surrounding the die tool, for example, a die holding-down device with the light guidance system. The die support is formed, for example, on the die holding-down device according to the holding-down device or according to the properties of the holding-down device lying opposite thereto, such as the joining punch holding-down device. The die holding-down device or the die support preferably has a light guidance system which is designed to guide a light beam of light in the direction of a joining site of the workpiece facing the tool counter-element when the workpiece is arranged at the joining tool unit, wherein the light guidance system is present in such a way at the die support that the light beam irradiates the joining site exclusively at an angle of greater than 0° to a movement axis of the tool of the tool counter-element, wherein the light guidance system of the die support shields the light along its light beam against the outside in a light-tight manner. The workpiece, for example, has a joining site facing the tool, such as a joining site facing the joining punch tool, for example, on a workpiece top side and an opposite joining site facing the tool counter-element, e.g. on a workpiece bottom side of the workpiece.

Advantageously, the holding-down device is designed as a holding-down device of a joining punch unit or as a holding-down device of a die unit. This allows for work with very flexible adaptation. It is possible to set up the light beam action on the workpiece preferably on both sides or on one side. This means that, for example, the workpiece or the respective surface can be heated or softened on both sides at the same time, i.e., for example, on the top and bottom sides, which takes place immediately before the joining operation, since otherwise the joining site material will cool down and thus harden. The light guidance system in the holding-down device of the joining punch unit or in the holding-down device of the die unit allows light or light radiation to be radiated onto a region of the subsequent joining site on the top side and/or on the bottom side of the workpiece in a targeted, controlled and safe manner. Compared with single-sided workpiece irradiation, for example, comparatively more energy can be introduced into the workpiece in the region of the joining site in the same time, if irradiation is performed on both sides simultaneously. If the workpiece consists of a plurality of workpiece layers, for example, two or more layers, each of which is made of different materials of the respective workpiece layer, it is also advantageously possible to apply energy to or heat the workpiece on both sides or on one side or only from the side of the joining punch unit or only from the side of the die unit or from both sides very flexibly and adapted to the respective material pairing or combination.

Basically, the workpiece with the respective workpiece layer is present between the tool and the tool counter-element or between the punch unit and the die unit. Since the technological properties of the respective workpiece layers can differ greatly in some cases due to the possible different materials, flexible single-sided or double-sided irradiation is advantageous. However, even with comparable material properties of the workpiece layer at the joining punch unit and the die unit, the double-sided holding-down device arrangement with the respective light guidance system is of advantage. Especially because of the comparatively high amount of energy that is needed in a short time. Preferably, an associated or joining-punch-side and/or die-side light source and an associated light guidance system in the respective holding-down device are provided for this purpose. It is advantageous to shorten cycle times during workpiece processing if the workpiece is heated on both sides.

An advantage is that the tool counter-element is designed as a die unit, and the holding-down device with the movable tool is a constituent part of a joining punch unit. This means that, for example, a tried-and-tested C-bracket tool can be optimized with a punch and die unit or equipped with the light guidance system. This makes it possible to use, for example, a clinching or riveting tool for workpieces made of expanded materials that have previously not been able to be processed therewith.

It is also conceivable that the tool counter-element is designed as a joining punch unit, and the holding-down device with the movable tool is a constituent part of a die unit.

The present invention is advantageously directed to a tool gripper with a joining tool unit according to any of the refinements described above and with a tool bracket. Preferably, the tool gripper comprises a C-bracket.

It is conceivable that the tool gripper is designed as a clinching, joining and/or embossing gripper. It is also conceivable that the tool gripper is available as a half-hollow punching rivet gripper and/or as a solid punching rivet gripper.

Advantageously, designing the tool gripper with the holding-down device and the light guidance system is comparatively easily possible. For example, a known tool gripper can be economically and technically advantageously designed. Advantageously, the basic design of the known tool gripper is retained. The holding-down device and the light beam feed must then be set up. Other components include, for example, a light source, line and supply components for the light, and further operating equipment, for example, for cooling and cleaning, or safety components. Such components are arrangeable, for example, away from the joining punch unit and the die unit.

For example, using a gas or air flow flowing in or along the joining tool unit, the joining tool unit in the region of the light guidance system or the line of the light guidance system can be flushed or subjected to pressure, for example, in order to minimize or eliminate contamination or to cool regions of the holding-down device that heat up due to the light beam. This can take place before and/or during and/or after the light is guided through the light guidance system.

A joining operation of a workpiece by a joining tool unit is also proposed, for example, a joining operation of a workpiece by way of a joining tool unit according to any of the aforementioned embodiments, wherein the joining operation comprises the following method steps:

arranging a workpiece to be processed at the joining tool unit, moving a holding-down device of the joining tool unit relative to a tool counter-element of the joining tool unit to a position where the holding-down device and the tool counter-element touch the workpiece, holding the holding-down device at the position, starting irradiation or illumination of a joining site of the workpiece with light from a light source of the joining tool unit when the holding-down device has reached the position.

It is further proposed that the joining operation may comprise one of the following further method steps:

detecting the position of the holding-down device by way of a sensor unit of the joining tool unit, checking by way of a control unit of the joining tool, based on the detection by the sensor unit, whether the holding-down device has reached the position, starting a movement of a movable tool of the joining tool unit in the direction of the joining site of the workpiece in order to join the workpiece, terminating the illumination or irradiation of the joining site of the workpiece at the same time as the start of the movement of the movable tool of the joining tool unit in the direction of the joining site of the workpiece or after the start of the movement of the movable tool of the joining tool unit in the direction of the joining site of the workpiece, checking by way of the joining tool unit whether the illumination or irradiation of the site of the workpiece to be joined is terminated in the joining operation of the workpiece by the movable tool, joining the workpiece by way of the movable tool before moving the holding-down device away from the position, moving the holding-down device away from the position after a movement of the movable tool in the direction of the site of the workpiece to be joined has started, checking by way of the joining tool unit whether the illumination or irradiation of the site of the workpiece to be joined is finished before moving the holding-down device away from the position.

This provides a safety function, in particular, in order to exclude a hazard to an employee and, in addition, in particular, unwanted heating of the movable tool can be controlled thereby.

BRIEF DESCRIPTION OF THE DRAWINGS

An exemplary embodiment will be explained in more detail on the basis of the following drawings while specifying further details and advantages.

FIG. 1 shows a perspective view from obliquely above of a tool gripper with a joining tool unit;

FIG. 2 shows a perspective view of a part of the joining tool unit;

FIG. 3 shows a further perspective view of the part of the joining tool unit according to FIG. 2;

FIG. 4 shows a sectional view of a part of the joining tool unit according to FIG. 1, wherein the joining tool unit rests with a holding-down device and a tool counter-element against a workpiece and wherein a profile of a light beam is indicated;

DETAILED DESCRIPTION OF THE INVENTION

Figure 6:
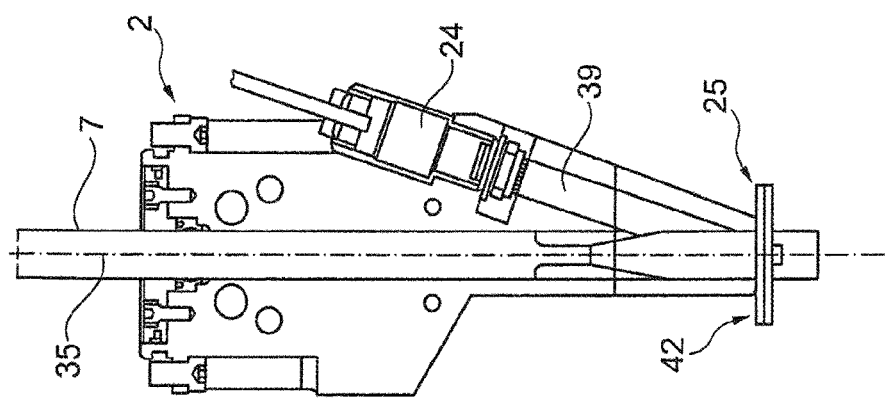
FIG. 6 shows a sectional view of a part of the joining tool unit with a pyrometer.

In FIG. 1, a tool gripper 1 with a joining tool unit 2 is shown. The tool gripper 1 has a tool bracket 3, wherein the joining tool unit 2 and a tool counter-element 4 of the joining tool unit 2 are arranged at the tool bracket 3. The tool bracket 3 is preferably designed as a C-bracket and can be attached, for example, via a connecting element 5 to a robot arm (not shown in FIG. 1), for example.

A tool counter-element 4, a holding-down device 6, a movable tool 7 (see FIG. 2), a drive unit 8, a light source 10 and a control unit 40 are formed on the joining tool unit 2. A connection of the light source 10 to the remaining joining tool unit 2 is not shown in FIG. 1.

The drive unit 8 can be designed as an electric, a pneumatic, a hydraulic or a hydro-pneumatic drive. For example, the drive unit 8 is connected to the tool bracket 3.

For example, the movable tool 7, for example, a joining or clinch punch, a pyrometer 24, and a light guidance system 9 are arranged on the holding-down device 6. The light guidance system 9 comprises a collimator 11, a first mirror 12, a second mirror 13, a beam trap 14 or a beam dump and a protective glass 15 (see FIGS. 4, 7). For example, the light source 10 is formed as a laser light source or as a laser, for example, as a fiber laser. The collimator 11 is preferably designed in such a way that a collimated light beam is generated, for example, a collimated laser beam is generated. For example, the light beams from the light source 10 are initially expanded and aligned at least approximately parallel to one another. The first mirror 12 is, for example, adjustable so that the position of a light beam from the light source 10 or the region irradiated by it on a workpiece 25 to be processed can be adjusted. The second mirror 13 is preferably positioned fixedly at the joining tool unit 2. The protective glass 15 forms, for example, a separation point between the optical units or the mirrors 12, 13 and the collimator 11 of the light guidance system 9, and the holding-down device 6. Furthermore, the beam diameter of the light beam can be changed or adjusted by an adjustment element 26 on the outside of the joining tool unit 2. At the end of the beam trap 14 or the beam dump, a heat sink such as a cooling plate 31 is preferably formed, which cools for cooling regions of the joining tool unit 2 or cools the beam trap 14 or the beam dump and adjacent surfaces. The cooling plate 31 is preferably releasably arranged on an outside of the holding-down device 6, and so the cooling plate 31 can be replaced and/or cleaned, for example, in case of wear or contamination.

Figure 8:
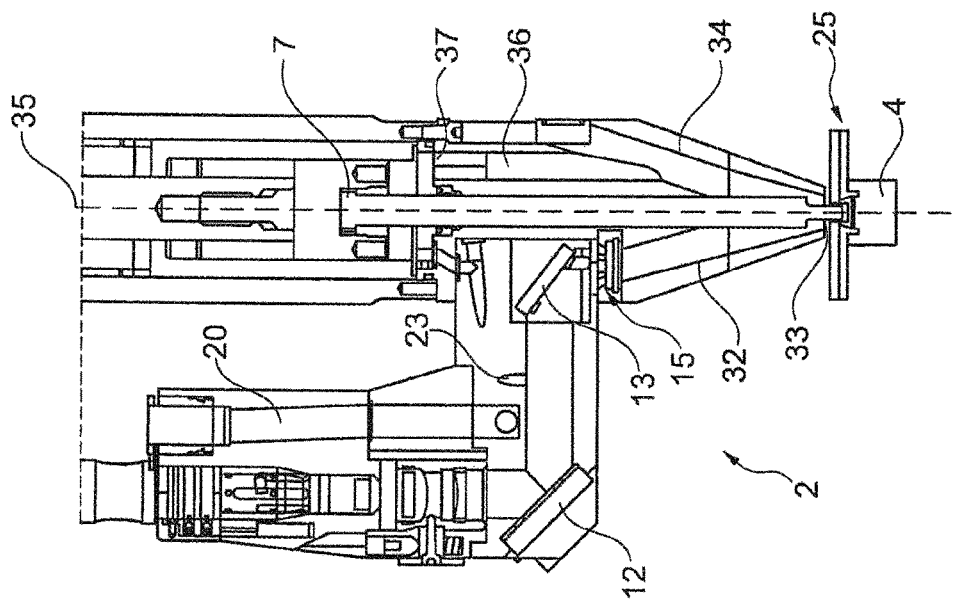
FIG. 8 shows a sectional view of the arrangement according to FIGS. 4, 5 and 7 in the starting position after the joining connection has been made.

The joining tool unit 2 preferably has slots 16, 17 in order to couple the light source 10 to the joining tool unit 2, for example, to plug it in and remove it. For example, slots 18, 19 for lines, such as an extraction line 20, and slots 21, 22 for an inlet 23 are also provided in the joining tool unit (see FIG. 8) so that a fluid flows in at the inlet 23 or can be extracted at the extraction line 20. For example, the fluid is a gas, e.g. air, in particular, in the ideal case air purified from particles. For example, the fluid is present as a purified gas, free of particles. It is also conceivable that the fluid is a specific gas, such as nitrogen or carbon dioxide.

A standard tool gripper, for example, a clinching gripper, can be retrofitted with a part of the joining tool unit 2, in particular, with a holding-down device 6 and a light guidance system 9, for example, by connecting the holding-down device 6 and the light guidance system 9 to the drive unit 8, which is preferably arranged at a tool bracket 3. For this purpose, the joining tool unit 2 preferably has a fastening element 27, wherein a part of the joining tool unit 2, in particular, the part of the joining tool unit 2 in which the slots 16, 17, 18, 19, 21, 22 are formed, can be connected to the drive unit 8 by means of the fastening element 27. Furthermore, the holding-down device 6 has a connection element 29 for connection to the drive unit 8. The fastening element 27 is preferably formed from a plate-type material, in particular, from a metal material. The fastening element 27 can be connected to the drive unit 8 by means of fastening means 30, e.g. screw means with screws. For example, a safety switch 28 is arranged at the fastening element 27.

FIGS. 4, 5, 6, 7 and 8 show sectional views of a part of the joining tool unit 2. From the light source 10, a light beam from the light source 10 is coupled into the light guidance system 9 in the region 41. The profile of the light beam is shown schematically by arrows L in FIG. 4. The light beam passes, for example, from the light source (not shown in FIG. 4) to the region 41 and then on to the collimator 11, wherein the light beam is then reflected, for example, at the first mirror 12 and at the second mirror 13 and travels, for example, through the protective glass 15 to the holding-down device 6. A first passage 32 is formed in the holding-down device 6, wherein the first passage 32 is, for example, a hole in the holding-down device 6. For example, the light beam passes through the first passage 32 to a cutout 33, which is formed open at a workpiece-side end of the holding-down device 6 at the end face of the latter. If the holding-down device 6 rests on a workpiece 25, the light beam is reflected at a preferably metal workpiece surface 42 of the workpiece 25, except for components of the light beam that are absorbed by the material of the workpiece, and enters a second passage 34, which is formed in the holding-down device 6, e.g. as a hole. Along and/or at the end of the second passage 34, the beam trap 14 or the beam dump is formed, so that the light beams reflected by the workpiece 25 are received and absorbed in the beam trap 14 or the beam dump.

For example, a further hole for the movable tool 7 is provided in the holding-down device 6, so that the movable tool 7 can be moved linearly along a movement axis 35 in the direction of the workpiece 25. For example, the hole and the passages 32, 34 merge into one another. A movement axis 35 preferably extends along a longitudinal extent of the movable tool 7 (see FIG. 6). The movement axis 35 continues, for example, through the center of the movable tool 7. A longitudinal axis of the first passage 32 or the second passage 34 is present, for example, in an angle region a between 5° and 40° relative to the movement axis 35 of the movable tool 7 at the holding-down device 6. Preferably, the second passage 34 is mirror-symmetrical to the first passage 32, wherein the movement axis 35 is, for example, a constituent part of a mirror plane or the mirror plane intersects the movement axis along its length.

For example, parts of the light guidance system 8 form a flow channel 38. For example, the first passage 32 and the second passage 34 of the light guidance system 8 and the cutout 33 form a part of the flow channel 38. The cutout 33 has a depth of a few millimeters in the direction of the movement axis 35, for example, between 1 and 7 millimeters. For example, the flow channel 38 extends mainly along the light guidance system 8 or coincides therewith, wherein the flow channel 38 begins only after the collimator 11. Furthermore, the flow channel 38 has a further, second cutout 36, which is preferably formed as a bore. For example, the second cutout 36 connects to a portion of the second passage 34 and runs parallel to the movement axis 35 of the movable tool 7. The fluid, e.g. air, enters the flow channel 38 via the inlet 23 and can flow along or within the flow channel 38. For example, the fluid in the region, viewed in the flow direction, after the collimator 11 up to the fluid-impermeable protective glass 15 accumulates, since the fluid can flow only past the outer sides of the protective glass 15, through a narrowing region in the flow channel, to the first passage 32. This causes an overpressure to be generated in the region after the collimator 11 up to the protective glass 15, at least as long as the fluid flows in through the inlet 23. For example, fluid flows in permanently via the inlet 23, for example, to flow over elements of optical units or the mirrors 12, 13 and to keep them clean. The fluid can flow from the flow channel 38 through the cutout 33 and a second outlet 37. The second outlet 37 is preferably arranged in the region of an end or at the end of the cutout 36, wherein the second outlet 37 is connected, for example, to the extraction line 20 so that the fluid flowing into the cutout 36 is extracted at the end of the cutout 36. For example, an extraction line 20 from which the fluid can be extracted from the flow channel 38 is arranged at the flow channel 38.

For example, the fluid is admitted through the inlet 23 into the flow channel 32 at least over the time of the complete joining operation, wherein the fluid flows out of the cutout 33 as long as the holding-down device 6 is not resting on the workpiece 25. For example, for a joining operation, the joining tool unit 2 is first moved in the direction of the workpiece 25 to be processed until the holding-down device 6 and the workpiece counter-element 4 rest against the workpiece. As soon as the holding-down device 6 rests on the workpiece 25, the drive 8 moves the movable tool 7 along the movement axis 35 in the direction of the workpiece 25 into a starting position according to FIG. 5. This situation represents a starting position of the movable tool 7. This minimizes a distance between the movable tool 7 and the workpiece 25, so that the movable tool 7 is spaced apart from the workpiece 25 over a comparatively short distance.

For example, a spring element is loaded by the movement of the movable tool 7 using the drive 8, as a result of which the holding-down device 6 is pressed against the workpiece 25 with a force provided by the spring element. This means that the holding-down device 6 is pressed, in particular, tightly against the workpiece 25, as a result of which light is to be prevented from exiting between the holding-down device 6 and the workpiece 25 or a light-tightness of zero to, for example, 10% against the outside is to be achieved. Furthermore, due to the comparatively high contact-pressure force of the holding-down device 6 on the surface of the workpiece 25 which rests against the holding-down device 6, heat can be transferred in an improved manner from a first workpiece part of the workpiece 25, such as a first workpiece layer which is in contact with the holding-down device, to a second workpiece part of the workpiece 25 or a second workpiece layer which rests against the tool counter-element 4.

For example, a check is then carried out as to whether the holding-down device 6 is resting against the workpiece 25 as desired. For example, the position of the movable tool 7 is initially determined by the control unit 40 for this purpose. For example, the position of the safety switch 28 is also ascertained, and thus the position of the holding-down device and the light guidance system 9 is checked. For example, after both checks confirm the desired state or provide the desired results and have been identified as correct, the pressure within the flow channel 38 is determined.

For example, for pressure determination, the second outlet 37 or a valve to the pump at the extraction line 20 is closed (see FIG. 4). As a result, the fluid accumulates within the flow channel 38 when the cutout 33 in the holding-down device 6 is covered by the workpiece 25 and when the flow channel 38 or the light guidance system 9 is not damaged. For example, the pressure in the flow channel 38 is measured by a sensor (not shown), e.g. a pressure sensor. The fluid or gas pressure measured by the sensor is communicated to the control unit 40, wherein the control unit 40 compares the pressure measured by the sensor with a specified threshold value or target range. The threshold value is preferably chosen such that even if the gap between the holding-down device 6 and the workpiece 25 is narrow, the pressure in the flow channel 38 measured by the sensor cannot exceed the threshold value. This ensures that the light source 10 can be activated only when the holding-down device 6 rests on the workpiece 25 as desired, e.g. perpendicularly, so that no light radiation or no light radiation that is hazardous to persons, such as laser radiation, exits to the outside.

Figure 5:
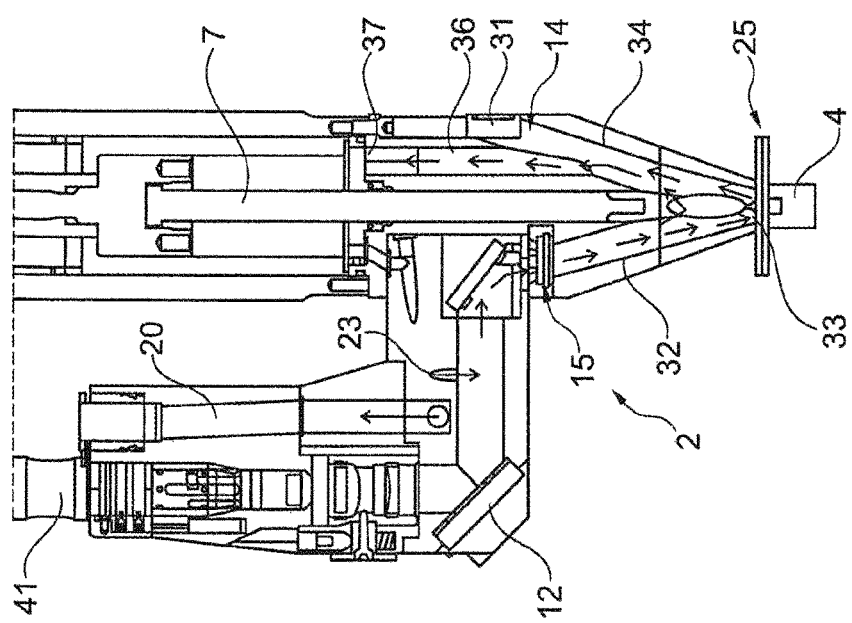
FIG. 5 shows a sectional view of the arrangement according to FIG. 4, wherein a profile of an air flow is indicated.

For example, after checking the pressure in the flow channel 3, the second outlet and/or a valve to the pump of the extraction line is opened so that a flow in the flow channel 38 is rebuilt (see FIG. 5, arrows). The fluid thus flows from the inlet 23 to the second mirror 13, to the protective glass 15 along the first passage 32 to the second passage 34 along the cutout 36 to the second outlet 37 and is extracted at the second outlet 37. In this way, adherents and soiling, e.g. on the mirrors 12, 13, are removed from the flow channel 38 by the flow in the flow channel 38.

For example, the control unit 40 activates the light source 10 as soon as the flow is formed in the flow channel 38. For example, the workpiece 25 is heated by the light beams from the light source 10, wherein a portion of the light beams are reflected at the workpiece 25, in particular, when the surface has not yet been heated. The direction of the light radiation is indicated by arrows L (see FIG. 5). The reflected light radiation passes along the second passage 34 to the beam trap 14 or beam dump. This ensures radiation protection without the need for an additional radiation protection cabin encasing the tool gripper 1.

For example, the temperature at the workpiece is measured by the pyrometer 24 (see FIG. 6). The pyrometer 24 is arranged at the holding-down device 6, wherein an associated hole 39 is formed in the holding-down device 6 which is necessary for the temperature measurement. For example, the hole 39 is present in the holding-down device 6 rotated circumferentially relative to the first passage 32 by 90° about the movement axis 35, e.g. rotated circumferentially by 90 angle degrees. Thereby, thermal radiation radiated by the heated workpiece 25 can reach the pyrometer 24 via the hole 39. A current or instantaneous temperature of the workpiece 25, in particular, a temperature of the surface of the workpiece 25 at the joining site of the workpiece, is determined in this way. For example, the pyrometer 24 transmits the measured temperature to the control unit 40, wherein in the control unit 40 a desired temperature or a temperature to be reached is stored and compared with the current measured value of the workpiece surface temperature. For example, a plurality of different temperatures to be reached for different materials are saved or stored in the control unit. For example, if the relevant temperature to be reached is reached before a specific period of time has elapsed, the light source 10 is deactivated or the joining operation is started early. If the temperature to be reached cannot be reached within the specified time period, the joining operation is aborted or another process step is initiated, for example.

Figure 7:
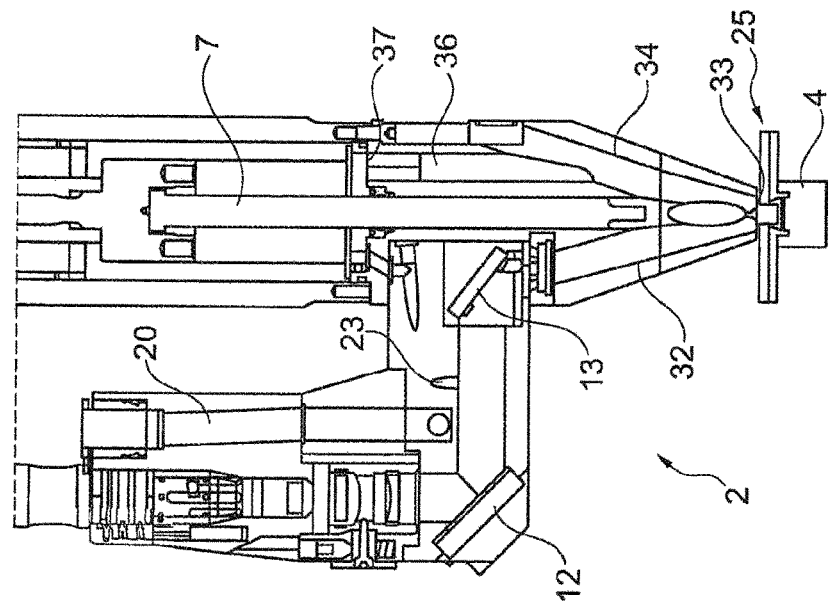
FIG. 7 shows a sectional view of the arrangement according to FIGS. 4 and 5, wherein a joining connection is made at the workpiece.

For example, a movement of the movable tool 7 in the direction of the tool counter-element 4 is started, in particular, immediately before switching off the light source 10 or at the same time as switching off the light source 10 or after switching off the light source 10 so that the workpiece 25 is joined at the joining site (FIG. 7). For example, the control unit 40 is designed to check whether the light source 10 and thus illumination of the workpiece 25 is switched off when the movable tool 7 reaches a region of the radiation path of the light beams from the light source 10 on its way in the direction of the tool counter-element 4. This is to prevent a front end of the movable tool 7 from being heated unintentionally by irradiation with light beams from the light source 10. This is also intended to ensure the safety of a person or employee at or in the proximity of the joining tool unit 2. However, it is also conceivable that the control unit first checks whether the light source 10 and thus illumination of the workpiece 25 is switched off and activates a movement of the movable tool 7 toward the workpiece 25 only after checking the switched-off light source 10.

For example, during the creation of the joining connection, a flow of the fluid in the flow channel 38 is maintained, in particular, permanently, so that contaminants, which arise, for example, during the creation of the joining connection, are entrained by the fluid flow and transported away (see FIG. 5).

For example, the movable tool 7 is moved back to a starting position according to FIG. 4 after completion of the joining operation. For example, the second outlet 37 is then closed.

For example, the joining tool unit 2, in particular, the holding-down device 6, is then moved away from the workpiece 25 by the drive 8. For example, fluid flows permanently through the inlet 23 in the direction of the cutout 33 so that optical units, for example, optical elements such as the mirrors 12, 13, are not contaminated, even during the standstill period.

LIST OF REFERENCE SIGNS

1 Tool gripper
2 Joining tool unit
3 Tool bracket
4 Tool counter-element
5 Connecting element
6 Holding-down device
7 Tool
8 Drive unit
9 Light guidance system
10 Light source
11 Collimator
12 Mirror
13 Mirror
14 Beam trap
15 Protective glass
16 Slot
17 Slot
18 Slot 19 Slot
20 Extraction line
21 Slot
22 Slot
23 Inlet
24 Pyrometer
25 Workpiece
26 Adjustment element
27 Fastening element
28 Safety switch
29 Connection element
30 Fastening means
31 Cooling plate
32 Passage
33 Cutout
34 Passage
35 Movement axis
36 Cutout
37 Outlet
38 Flow channel
39 Hole
40 Control unit
41 Region
42 Workpiece surface

The invention claimed is:

1. A joining tool unit comprising a holding-down device with a linearly movable tool, and a tool counter-element,
wherein the holding-down device with the linearly movable tool and the tool counter-element are located opposite each other, wherein a workpiece in the arranged state at the joining tool unit rests on the tool counter-element, wherein the holding-down device in the arranged state of the workpiece at the joining tool unit is arrangeable so as to abut a surface of the workpiece, wherein the holding-down device has a light guidance system,
wherein the light guidance system is designed to guide a light beam of light in the direction of a joining site of the workpiece when the workpiece is arranged at the joining tool unit, wherein the light guidance system is present at the holding-down device in such a way that the light beam irradiates the joining site exclusively at an angle of greater than 0° to a movement axis of the linearly movable tool, wherein the light guidance system of the holding-down device shields the light along its light beam against the outside in a light-tight manner, wherein the light guidance system is integrated in the holding-down device such that the light beam can be brought directly to the workpiece, wherein the light-tight shielding at the holding-down device by way of the light guidance system is set up due to the line of the light guidance system within the holding-down device carved out from the solid material of the holding-down device, and
wherein the holding-down device is designed in such a way that in the arranged state of a workpiece at the joining tool unit, the holding-down device is arrangeable so as to abut the surface of the workpiece such that the holding-down device encloses the joining site so that a maximum of 20% of the radiant power of the light is emitted to the outside between the holding-down device and the surface.

2. The joining tool unit as claimed in claim 1, wherein the light guidance system is present at the holding-down device in such a way that the light beam irradiates the joining site of the workpiece exclusively in an angle region of between 5° and 40° relative to the movement axis of the linearly movable tool.

3. The joining tool unit as claimed in claim 1, wherein the linearly movable tool is designed as a joining punch.

4. The joining tool unit as claimed in claim 1, wherein the tool counter-element has a second movable tool.

5. The joining tool unit as claimed in claim 1, further comprising a second light guidance system at the tool counter-element in order to guide light in the direction of a further or rear surface of the workpiece, wherein the workpiece rests at least with a section of the rear further surface on the tool counter-element.

6. The joining tool unit as claimed in claim 1, wherein the holding-down device is designed as a holding-down device of a joining punch unit or as a holding-down device of a die unit.

7. The joining tool unit as claimed in claim 1, wherein the tool counter-element is designed as a die unit and the holding-down device with the movable tool is a constituent part of a joining punch unit.

8. A tool gripper with a joining tool unit as claimed in claim 1 and a tool bracket.

9. A joining operation of a workpiece by means of a joining tool unit as claimed in claim 1, comprising the successive method steps:
arranging a workpiece to be processed at the joining tool unit;
moving a holding-down device of the joining tool unit relative to a tool counter-element of the joining tool unit to a position where the holding-down device and the tool counter-element touch the workpiece;
holding the holding-down device at the position; and
starting irradiation or illumination of a joining site of the workpiece with light from a light source of the joining tool unit when the holding-down device has reached the position.

10. The joining operation as claimed in claim 9, further comprising the following method step:
starting a movement of a movable tool of the joining tool unit in the direction of the joining site of the workpiece in order to join the workpiece.

11. The joining operation as claimed in claim 9, further comprising the following method steps:
terminating the illumination or irradiation of the joining site of the workpiece; and
moving the holding-down device away from the position.

12. The joining operation as claimed in claim 9, further comprising the following method step:
terminating the illumination or irradiation of the joining site of the workpiece at the same time as the start of the movement of the movable tool of the joining tool unit in the direction of the joining site of the workpiece or after the start of the movement of the movable tool of the joining tool unit in the direction of the joining site of the workpiece.

* * * * *